3,438,693
SPATIAL FILTERING SYSTEM UTILIZING REFLECTION OPTICS
Samuel Pinckney Cook, Houston, Tex., assignor to Shell Oil Company, New York, N.Y., a corporation of Delaware
Filed Apr. 29, 1965, Ser. No. 451,795
Int. Cl. G02b 5/18, 1/00; G01v 1/00
U.S. Cl. 350—162                3 Claims

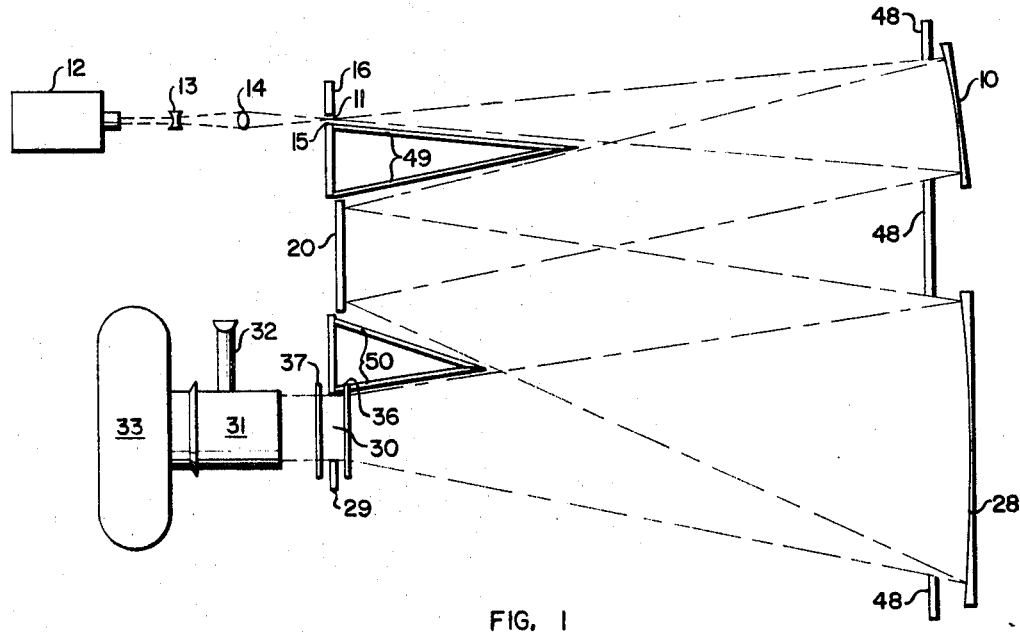
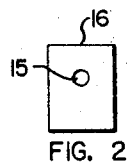
FIG. 2A
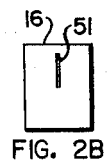
FIG. 2B
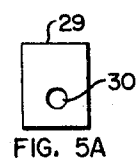
FIG. 5A
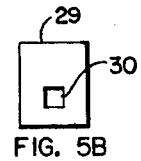
FIG. 5B
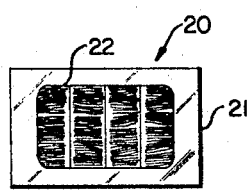
FIG. 3
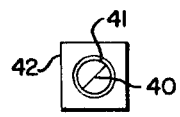
FIG. 6A
FIG 6B
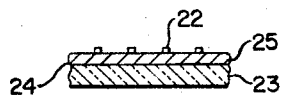
FIG. 4
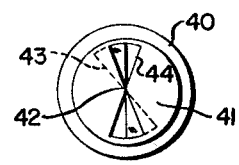
FIG. 6C
INVENTOR:
SAMUEL P. COOK
BY: 
HIS ATTORNEY INVENTOR:
SAMUEL P. COOK
BY: *signature*
HIS ATTORNEY United States Patent Office 3,438,693
Patented Apr. 15, 1969

ABSTRACT OF THE DISCLOSURE

A method and apparatus for the formation of Fraunhofer diffraction patterns of seismic data using reflection optics and light diffracted from replicas of variable density or light and dark recordings so that more accurate optical filtering may be done.

---

This invention relates to a method and apparatus for the optical processing of two dimensional "pictorial" form records, i.e., light and dark or variable intensity, by utilizing the light diffracted from specially prepared replicas of the recordings. While the invention is directed primarily to the optical processing of seismic records which have been recorded as variable area or variable density recordings, the method and apparatus may be applied equally well to the processing of any data presented in two dimensional pictorial form.

As is well known in the art of geophysical prospecting, a seismic shock is imparted to the earth, generally by means of an explosion, and the seismic waves reflected and/or refracted and/or diffracted back to the surface by the subterranean strata are detected at selected spaced points on the earth's surface, the selected points being at predetermined distances from the shock imparting or "shot" point. From these detected signals, the depths of the subsurface reflecting, refracting, or diffracting strata can be determined by measuring the time intervals between the initiation of the seismic shot and the incidence of selected parts on the incident wave at the detection point. Generally, the various detected seismic signals are corrected for various factors, such as the velocity in the weathered layer and differences in elevation of the shot point and the various detecting points, and then recorded in a side by side relationship. By carefully selecting the shot points and associated detecting points in different areas on the earth's surface, and then placing the records from the various shot points side by side, a more or less accurate two dimensional rendition of a cross-section of the subsurface is obtained. Preferably, these records of the cross-section of the subsurface or "seismic sections" are photographically recorded by variable density or variable area techniques so that the resulting record is a pictorial presentation of the earth's structure which may then be visually studied by a geophysicist.

As often occurs, however, the useful and desired information in the seismic section is only one portion of the total and is obscured by unwanted signals superimposed thereon. These unwanted signals may be caused, for example, by multiple reflections from shallow beds. The intelligibility of the seismic section can sometimes be enhanced by harmonically filtering the various detected signals. Normally, this harmonic filtering is performed prior to the preparation of the seismic section by utilizing frequency domain filters to selectively filter the time signals received from the individual geophones in electrical form. This type of processing, when considered as a harmonic filter operating on the spatial structure of the seismic section, only filters in one spatial dimension. Two-dimensional spatial filtering requires more elaborate schemes often involving complex and costly digital data processing equipment.

In order to eliminate the above problems and to preserve the perceptual advantages of a visual presentation to the geophysicist, it has been proposed that the signals be optically processed. The old and well-known phenomena of Fraunhofer diffraction is utilized to produce essentially the two dimensional Fourier transform of the spatial structure of the diffracting object, namely, the seismic section. In principle, the Fraunhofer diffraction pattern is the diffraction pattern produced at an infinite distance by an object illuminated by a source of coherent light also infinitely distant. In practice, however, this two dimensional Fraunhofer diffraction pattern may be found along the focal plane of an imaging lens or mirror placed in the path of the diffracted light, and the illumination may be obtained from a point source which is located at a finite distance and whose rays are collimated by a collimating lens or mirror. Preferably, the light source used is monochromatic in order to produce better resolution and less complexity in the resulting diffraction pattern. However, it should be noted that the light source need not be completely monochromatic but may, for example, be an intense light source whose output has been filtered to restrict the wave length to a suitably narrow band of frequencies.

In order to use this basic phenomenon for the filtering of seismograms, a system according to the prior art produces a transparency replica, e.g., on photographic film, of the variable area or variable density recording and passes a beam of collimated monochromatic coherent light through the film. The light diffracted by the spatial structure on the film forms a Fraunhofer diffraction pattern in the back focal plane of the lens and continues to converge to form a real image of the transparency at a more distant plane. By selectively filtering in the plane of the Fraunhofer diffraction pattern, it is possible to selectively filter the seismic record with respect to its spatial frequency content and to attenuate undesirable background interference or noise in the record. Once the record is properly filtered, it may be photographed and studied by the geophysicist.

While the above-described system for optically processing seismic records is a great improvement over the previously known systems of processing seismic data, various problems arise because of the particular form of the seismic record from which the Fraunhofer diffraction pattern is derived, i.e., the film transparency. Since the system depends on an accurate formation of the Fraunhofer diffraction pattern, that is to say, on the interference at infinity of optical rays originating from all portions of the original seismic section, care must be taken to insure that no optical path errors are introduced into the diffraction pattern by irregularities in the physical properties of the film record, for example, varying thickness and/or refractive indexes of the photographic emulsion or transparent film base. The first two mentioned irregularities cause uncontrolled variations to occur in the optical paths of the light rays due to varying amounts of refraction of the light passing through the film; and, therefore, it is important that both surfaces of the film be optically flat and parallel. Since for practical reasons it is virtually impossible to insure that a film having regular physical properties has been used, in the prior art system the film is placed together with a fluid having the same index of refraction as the film between two transparent optically flat plates which are then pressed together. The fluid then tends to smooth out both surfaces of the film and also tends to compensate for any irregularities in the thickness of the film. While the record prepared in this manner produces some improvement in the optical performance of the system, i.e., it attempts to eliminate the errors due to different amounts of refraction, in practice the compensation is only partially successful.

In addition to the above-mentioned problem with the prior art system, it should be noted that in order to obtain good dispersion of the Fraunhofer diffraction pattern, the lens used to bring the Fraunhofer diffraction pattern to a focus should have a long focal length. Moreover, in order to obtain good resolution of the diffraction pattern, large light apertures are needed. These two conditions of a long focal length and large apertures are relatively difficult and expensive to satisfy with a lens system.

Briefly, according to applicant's invention, the above problems inherent in the prior art system are eliminated by utilizing reflection optics in place of the transmission optics of the prior art system. Moreover, the overall light losses are generally less in a reflective system since fewer surfaces are usually involved, and more importantly loss of contrast and ghost images caused by spurious reflections are reduced. The film record of the prior art system is replaced by a "reflection replica" comprising an optically flat reflective surface having a relief image or facsimile of the seismic record replicated thereon, preferably by photographic processes utilizing either a silver halide sensitized emulsion, a photo-sensitive plastic such as Kodak Photo Resist, or some other photo-sensitive material. The photo-sensitive plastics are preferred since by their use, relief images are produced which after processing result in the reflective surfaces having a surface flatness as good as the original substrate. The reflective surface with the facsimile of the seismic section thereon is positioned to be illuminated by light from a source of spatially coherent light which has been collimated by a collimating mirror. The light may or may not be monochromatic according to the operator's choice and the particular filtering operation being undertaken, i.e., monochromatic or substantially monochromatic light may be required in those instances where specific resolution requirements are made in the Fourier plane. The light diffracted by the reflection replica is collected and focused by means of an imaging mirror to form the Fraunhofer diffraction pattern or Fourier transform of the spatial structure of the facsimile and then re-imaged by any convenient optical system. Appropriate filters are then interposed in the optical path between the replica of the seismic section and the re-imaged seismic section. By observing the Fraunhofer diffraction pattern and/or the re-imaged filtered seismogram, the geophysicist can determine the particular type of filters which are to be used. Preferably, the filters utilized are located in the focal plane of the imaging mirror which is the locus of the Fraunhofer diffraction pattern. Filters located here correspond to harmonic filtering in the conventional meaning of that term. However, filters may be introduced at desired locations along the paths of the optical rays but out of the focal plane of the imaging mirror plane in order to perform a generalized filtering.

As can easily be seen, the problems present in the prior art system due to the difficulty and expense of utilizing long focal lengths and large apertures are eliminated by use of mirrors. More importantly, the elimination of spurious reflections improves image contrast, eliminates ghost images, and diffraction and interference artifacts superimposed on the image are greatly reduced. Moreover, the use of a "reflection replica" of the seismic section in place of the "transmission replica" of the prior art system eliminates the problem resulting from refraction irregularities in the film record of the seismic section utilized. As can be easily appreciated, it is easier to produce a single optically flat reflective surface; and since the light to be diffracted at no time passes through the main body of the plate or surface having the facsimile thereon, variations in the thickness of the plate and of the composition of the plate are of no consequence. In addition, this technique permits the fabrication of "phase" replicas as well as the more usual "amplitude" replicas whereas phase replicas can not be easily made with the prior art system. By phase replicas we mean relief images which are completely transparent but whose film thickness and hence optical path lengths carry the desired information.

Applicant's invention and the advantages thereof will be more clearly understood from the folowing detailed description when taken in conjunction with the accompanying drawings wherein:

FIGURE 1 is a schematic drawing of an apparatus for the optical processing of seismic records according to the invention;

FIGURES 2A and 2B are plan views of a portion of the apparatus of FIGURE 1 showing two different types of entrance apertures for the light to the optical system;

FIGURE 3 is a plan view of the reflection replica showing the facsimile of the seismic record thereon;

FIGURE 4 is an enlarged sectional view of the reflection replica of the seismic record shown in FIGURE 3;

FIGURES 5A and 5B are plan views of a portion of the apparatus shown in FIGURE 1 illustrating a number of different apertures which may be utilized at the locus of the Fraunhofer diffraction pattern;

FIGURES 6A, 6B and 6C are plan views showing a number of different types of filters which may be used with the apparatus of FIGURE 1;

Figure 7:
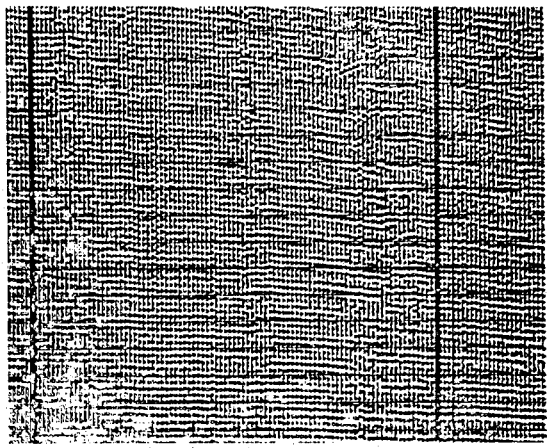
FIGURE 7 is an enlarged view of a portion of a seismic section prior to filtering according to the invention.

Referring now to the drawings and, in particular, FIGURE 1, there is shown a collimating mirror 10 having a point source of spatially coherent light 11, preferably monochromatic, located substantially in the focal plane of the mirror 10. This point source may even be a virtual image produced, for example, by a suitable convex mirror or diverging lens. Any conventional means for producing the point source of light 11 at the desired location may be utilized. For example, one conventional arrangement for producing a point source of monochromatic coherent light is to filter the collimated light from a compact arc mercury vapor lamp, a concentrated arc zirconium arc lamp or a xenon lamp to produce monochromatic light and then to focus this monochromatic light through a pinhole. While this method of forming the desired monochromatic coherent light operates satisfactorily, it should be noted that the method is relatively inefficient due to large light losses and therefore requires that a relatively intense principal light source lamp be used in order that the light coming through the pinhole may be of sufficient intensity to be useful in a practical application. Accordingly, according to applicant's invention, as an illuminator option, applicant allows for the use of a laser light source 12, such as a helium-neon gas laser or a ruby crystal laser which produce light at approximately 6328 A. and 6943 A., respectively, or any of the other many varieties of lasers. However, the extreme degree of collimation and monochromaticity provided by the laser is required for only relatively few filtering applications. A laser light source provides some advantages over the previously described illuminators since the light produced by a laser is inherently both monochromatic and spatially coherent; thereby eliminating the intensity losses incurred when collimating and filtering the more usual illuminators.

The light beam from the illuminator, i.e., in the preferred embodiment, the laser 12, is preferably brought to a focus to produce the point source of light 11 by being passed through a pair of lenses 13 and 14. The purpose of the lens 13 is to insure that the entering light beam covers the desired portion of the surface of the condensing lens 14 which then focuses the light to produce the desired point source of coherent light 11. As indicated in the figure, the light from the condensing lens 14 is brought to a focus through a circular aperture 15 in an opaque plate 16, e.g., metal (see FIGURE 2A), which is also located substantially in the focal plane of the mirror 10, the aperture 15 constituting the entrance aperture or pinhole to the optical processing instrument. In the case of a laser light source, this entrance aperture is provided to eliminate the outer fringes of the light beam from the laser 12 which are varying in intensity, in order that the point source of light be of uniform intensity and consequently uniformly illuminate the collimating mirror 10. This entrance pinhole is, of course, required for collimation of non-laser illuminators. Such uniform illumination of the collimating mirror and the subsequent uniform illumination of the diffraction replica are required in order to form a Fraunhofer diffraction pattern which is a true Fourier transform of the spatial structure of the reflection replica. In order to perform this function, the light from the condensing lens 14 is focused in the center of the aperture 15 which should be of sufficiently small diameter so that it is completely filled by the uniformly diffuse light and blocks the varying intensity fringence.

Positioned to be illuminated by the collimated light from the collimating mirror 10 is an object or reflection replica 20 of the seismic record to be analyzed. As indicated in FIGURE 3, the object replica 20 consists of a plate 21 having an optically flat reflective surface on which has been reproduced a facsimile 22 of the variable area or variable density seismogram. Although any type of highly reflective optically flat surface may be utilized, for example, a highly polished piece of metal preferably as shown in FIGURE 4, the object replica comprises a glass plate 23, for example, a 1½ by 3 inch microscope slide, having an optically flat surface 24 which has been coated with a highly reflective coating 25. The facsimile 22 on the surface of the highly reflective coating 25 is the desired relief image of the seismic record to be analyzed.

Although any desired method of producing the reflection replica 20 of the seismic record to be analyzed may be utilized, preferably according to applicant's invention, the reflection replicas are prepared by photographic processes where by relatively high resolution replicas of the seismic sections can be realized. According to the invention, the reflection replicas are produced by coating, for example, by vacuum evaporation techniques, a prepared optically flat surface of a flat glas plate with a thin, highly reflective coating of metal, for example, aluminum, chromium or silver. The metal coating is then overcoated with a thin film approximately 1 micron in thickness of a photosensitive plastic such as Kodak Ortho Resist. Such photosensitive plastics have the property of being rendered insoluble in the developing solutions utilized when exposed to light. The photosensitive plastic is then exposed to light which has been passed through a film reproduction, for example, microfilm, of the desired seismogram so that effectively a contact print of the film is made on the coated surface. Direct exposure in a suitable camera is also practical. The exposed plate is then developed by standard developing techniques for such photosensitive plastics whereby the unexposed portions of the photosensitive plastic are dissolved away, resulting in a relief image of the seismic section remaining on the plate 21. If desired, the reflection replica may then be baked to render the remaining plastic relatively insoluble. If the particularly reflection replica is to be used as an amplitude grating, then, following development of the replica, the replica should be dyed with any suitable dye, for example, Kodak Photo Resist dye, in order to render opaque the portion of the replica which is overlaid by the remanent plastic. It should be noted, however, that because of the inherent properties of the photosensitive plastics, it is also possible to produce reflection replicas accounting to the invention which can be utilized as phase gratings for the diffracted light. If this latter form of grating is desired, then exposure and development must be so executed, utilizing techniques which in themselves are known in the art, that the thicknesses of the remanent photo-resist is in the desired proportions and no dyeing of the replica is required. Other processing methods are also suitable for producing the desired relief facsimile of the record on the flat optical surface of the plate 21. For example, after proper exposure of the plate to the record, the facsimile of the record may be etched into the reflective surface by a suitable etching solution, for example, hydrofluoric acid, hydrochloric acid, ferric chloride solution, or any of the various proprietary etchants.

The diffracted light from the reflection replica 20 is collected by an imaging mirror 28 which causes parallel light rays striking its surface to converge to points in its focal plane and thereby form the Fraunhofer diffraction pattern or Fourier transform of the spatial structure of the reflection replica 20. Although the mirrors 10 and 28 are shown as two separate mirrors, these mirrors may actually be portions of a single mirror. Preferably, however, the mirrors 10 and 28 are close together and the reflection replica 20 is along the optical axis of the mirror system in order to prevent undue off axis optical distortions. Moreover, it should be noted that the particular distance of the reflection replica from the collimating and imaging mirrors 10 and 28, respectively, will not change the location of the Fourier image of the reflection replica 20, i.e., the focal plane of mirror 28, but it will change the angular convergence of the rays and hence will effect the point at which the real image of the reflection replica 20 is formed.

Located in the focal plane of the imaging mirror 28 is an opaque or metal plate 29 having an aperture 30 therein hereafter called the Fourier aperture. As shown in FIGURES 5A and 5B, Fourier aperture 30 may have any desired shape, for example, the circle shown in FIGURE 5A or the square shown in FIGURE 5B, but preferably has approximately the same area as the facsimile 22 in order to distribute resolution reasonably equally in the "real" and the "Fourier" domain. The particular dimensions of the Fourier aperture 30 are determined by the desired limits of the spatial structure, i.e., the high frequency cutoff, and the scale of the Fourier transform which in turn is dependent on the wave length of the light and the focal length of the imaging mirror 28. Preferably, when utilizing the instrument, and in order to produce a Fourier transform having the same high frequency limits on all sides, the "zero order" image of the entrance aperture should be in the center of the Fourier aperture 30. This can be accomplished by initially replacing the object replica 20 by a plane flat mirror and adjusting (1) the vertical and horizontal positions of either the Fourier aperture 30 or the point source of light 11, (2) the orientation of the mirror substituted for the object replica 20, or (3) the orientation of mirrors 10 and 28, until the focused dot of light corresponding to the entrance aperture is in the center of the Fourier aperture. Preferably, the instrument is designed so that the "zero order" image of the entrance aperture is centered in Fourier aperture 30 when the replica 20 is exactly normal to the optical axis of the system.

After passing through the Fourier aperture 30, the rays diffracted from the reflection replica 20 are re-imaged by any convenient optical means whereby the re-imaged facsimile of the seismic record may be visually observed, for example, by means of the microscope 31 and the eyepiece 32. However, it is to be understood that other means for viewing the filtered image may be utilized such as a closed circuit television camera or merely a projection screen. In order to enable the making of a permanent record of the re-imaged light, the microscope 31 is provided with a camera 33 or other suitable recording device. The entrance aperture of the viewing and recording system should be sufficiently large and placed sufficiently close to the Fourier aperture 30 so that all of the light rays which have passed through the Fourier aperture 30 are utilized in order that additional uncontrolled and undesired filtering be avoided.

In order to selectively filter the diffracted light rays, one or more filters 36 and 37 are interposed at appropriate locations in the optical path of the diffracted light. Preferably, as shown in the drawing, the filters 36 and 37 are located in the focal plane of the imaging mirror 28. The placing of the filters at the focal plane of the imaging mirror 28 or, in other words, at the locus of the Fourier transform of the spatial structure of the record to be analyzed, is desired since at this position optical filters produce effects which are in close relation to the large body of theoretical literature on the Fourier transform. The ease in constructing filters at this locus is brought about by the well-known fact that the light rays diffracted by a slit (or alternatively an opaque straight line against a clear background) are all in directions perpendicular to the original slit. Consequently, a single opaque straight line in the Fourier plane will eliminate from the final image all structure in the original which consisted of lines perpendicular to the opaque line in the Fourier plane. Since the two-dimensional Fourier transform of the spatial structure of an object is representative of the horizontal and vertical spatial frequency components therein, opaque objects placed in the Fourier plane will suppress frequencies at the locus of the opaque object, while transparencies will allow the frequencies to pass, i.e., opaque objects act as stop band filters while transparent regions act as pass band filters. Moreover, by selectively varying the density of the filters, the amplitude portion of the signals may be selectively filtered. Phase filters are also practical wherein the relative phase of the light waves is altered independently of its amplitude. Such filters are well known in the field of optics and may consist of a transparent disc having a variable thickness so that the relative phases of the different light rays proceeding through the disc are selectively altered by varying the thickness at selected locations on the disc. Alternatively, filters may be constructed which filter the light rays with respect to both their amplitude and phase.

Figure 8:
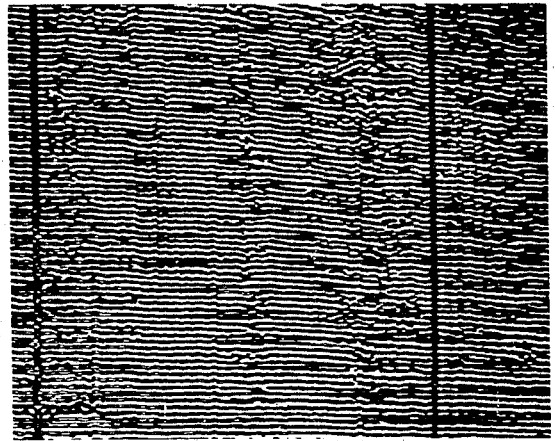
FIGURE 8 is an enlarged view of the section of the seismogram shown in FIGURE 7 after filtering utilizing a filter such as shown in FIGURE 6B.

Referring now to FIGURE 6, there are shown a number of examples of simple filters which may be used with the apparatus and method according to the invention. As shown in FIGURE 6A, one type of filter which may be used comprises a wire 40 mounted in a frame 41 which is free to rotate within a plate 42. When such a filter is placed in the Fourier plane, any frequency components lying along the axis of the wire 40 will be suppressed and consequently filtered out of the re-imaged replica 22. By observing the re-imaged diffracted light and rotating the wire 40, the geophysicist or other operator can observe the particular orientation at which undesired signals are removed or, in other words, when the desired information is made more clear on the record. Experiments have shown that this filtering can be done with great delicacy. In one example a human hair was used as a filter over a Fourier aperture of a 2-inch diameter. With exact adjustment structures could be completely removed with negligible effect on other sets of parallel lines at only slight inclination to the originals. The filter shown in FIGURE 6B consists essentially of a plate 44 having a slit 45 therein. The slit 45 effectively acts as a band pass filter which passes almost all of the horizontal components of the frequency spectrum and, depending on its width, filters out the higher vertical frequency components. By varying the position of the slit and/or the vertical and horizontal dimensions of the slit, various undesirable frequency components may be eliminated. The results of filtering by means of a filter such as shown in FIGURE 6B are shown in FIGURES 7 and 8. FIGURE 7 is an enlarged reproduction of the original variable area seismogram or, in other words, a reproduction of the record which is replicated on the plate 21. As can easily be seen from this reproduction, the signals therein line up in vertical columns. After filtering by means of a pass band filter such as shown in FIGURE 6B a photograph of the re-imaged diffracted light produces a pattern such as shown in FIGURE 8. As can be easily seen from this drawing, the traces now appear to be horizontal lines. This results from the suppression of the vertical spatial structure of the original seismic section.

Another type of filter which is of particular importance is seismic work is the filter shown in FIGURE 6C which is referred to as a "pi slice" filter. Such a filter consists generally of a pair of adjacent opaque discs 40 and 41, which are mounted to rotate about a common axis 42. Each of the discs 40 and 41 is provided with an aperture 44 and 45, respectively, which is the shape of a pair of equal sectors formed between two displaced diameters of the discs. By placing the discs 40 and 41 in the optical path of the diffracted light and rotating the discs 40 and 41 relative to one another, the effective size of the aperture 44, and hence the quantity and portion of the light pattern striking the surface of the disc 41, can be selectively varied.

As oftentimes occurs, it is required that the Fourier pattern be observed and/or recorded. Observation of the light pattern of the Fourier aperture may be achieved by replacing the filter 37 with an unexposed photographic plate in order to record the Fourier pattern, by replacing the filter 37 with a piece of ground glass, by focusing a microscope or camera on this plane, or by other optical means so that the Fourier pattern may be observed.

It should be noted that although a few simple types of filters have been shown, it is to be understood that many other types of filters which may provide complex filtering functions can be used. For example, another type of filter which might be utilized is a "negative" copy of the Fourier transform which has been made photographically and which is placed in the path of the diffracted light as exactly the position that the picture was taken. Such a filter has the property of equalizing the intensity of the various converging light rays in the Fourier plane and hence tends to reduce or eliminate the large energies due to the initial seismic receptions or "first breaks." This type of filter may be made with ordinary photographic film or by placing a piece of photochromic glass at the desired location. Since this type of glass has the property of adjusting its density in proportion to the incident light intensity and thereby forming a negative type picture of the incident light pattern, the desired filter will be automatically formed and will require no movement to insure proper registration. Moreover, since it is another property of this type of glass that the image formed thereon fades with time, the same piece of glass may be used over again. The photochromic glass has the additional property of being photosensitive in a definite wave length region, usually in the blue region of the spectrum. This allows for the additional possibility that its density may be controlled in this region, for example, by projecting a desired filter onto the glass by means of blue light, and its filtering action used with an optical system using diffracted light in the red end of the spectrum. Of course, in such an application, the resultant light must be filtered to remove the light in the blue region of the spectrum in order that only the desired filtered diffracted light pattern remains, i.e., the red light.

It should further be noted that although the invention has been described for producing the Fourier transform of the spatial structure of the replica of the seismogram, and therefore requires that the replica be uniformly illuminated, if it is desired to emphasize various portions of the record at the expense of the remaining portions of the record, generalized Fourier transforms may be realized by nonuniform illumination of the record replica. For example, nonuniform illumination may be achieved by altering the focal length of either of the lenses 13 or 14 and/or the position of the entrance aperture 15. Preferably, nonuniform illumination of the reflection replica 20 is achieved by masks having various shaped apertures placed either in front of the replica 20 or the collimating mirror 10. Such masks, which are well known both in the general field of optics and in the particular field of optics as applied to seismic work and which may be of the step type or of the continuous tone type, tend to taper the illumination of the replica in a controlled and desired manner depending on the particular shape of the mask aperture to give a generalized harmonic filtering.

It should also be noted that the drawing of the system shown in FIGURE 1 is a schematic diagram and, accordingly, all of the various light stops and diaphragms required for precision optics are not illustrated. For example, the mirrors 10 and 28 and the reflection replica 20 may be provided with diaphragms or light shields such as indicated generally by reference numerals 48, 49 and 50, so that only the desired light rays impinge on the various members and all extraneous light is obscured.

While the invention has been described primarily for the two-dimensional spatial filtering of pictorial type records, the basic optical system shown may also be used for one-dimensional spatial filtering if desired. The conversion of the system for one-dimensional spatial filtering is easily accomplished by replacing the pinhole type of entrance aperture 15 with a thin, slit-shaped entrance aperture 51 such as shown in FIGURE 2B. Other useful variations of the instrument may be obtained by using astigmatic components in the camera optics.

Obviously, various other modifications of the invention are possible in light of the above teachings without departing from the spirit of the invention. It is therefore to be understood that within the scope of the appended claims the invention may be practiced otherwise than as specifically illustrated.

I claim as my invention:

1. Apparatus for optically processing a two-dimensional pictorial form record comprising:
   a collimating mirror;
   an opaque plate having an entrance aperture therein, said plate being disposed in the focal plane of said collimating mirror such that light passing through said entrance aperture will uniformly illuminate said collimating mirror;
   means for producing monochromatic light;
   means for focusing said monochromatic light to form a point source of light, said means being positioned so that said monochromatic light is focused at said entrance aperture;
   a reflection replica including an optically flat specularly reflective surface having a relief facsimile of the record to be analyzed reproduced thereon, said replica being laterally disposed with respect to said entrance aperture and positioned to receive the light rays collimated by said collimating mirror;
   an imaging mirror positioned laterally of the collimating mirror to gather the light rays diffracted from said replica and to focus said diffracted light rays at points laterally displaced from said reflective surface and said point source of light to form an optical Fourier transformer of said replica in the focal plane of the imaging mirror;
   means for spatially filtering the light rays diffracted from said replica, said means being positioned in the focal plane of said imaging mirror; and
   means for observing the filtered diffracted light rays.

2. The apparatus of claim 1 wherein said entrance aperture is a pinhole whereby a two-dimensional diffraction pattern of the replica results.

3. The apparatus of claim 1 wherein said entrance aperture is a slit which is properly oriented to produce a one-dimensional diffraction pattern of the replica.

References Cited

UNITED STATES PATENTS

| | | | |
|---|---|---|---|
| 2,671,376 | 3/1954 | Merton | 88—145 |
| 2,924,142 | 2/1960 | Nomarski | 350—13 |

FOREIGN PATENTS 1,139,295　11/1962　Germany.

OTHER REFERENCES

Jackson: Geophysics, vol. XXX, No. 1, February 1965, pp. 5–23.

DAVID SCHONBERG, *Primary Examiner.*

RONALD J. STERN, *Assistant Examiner.*

U.S. Cl. X.R.

88—1; 340—15.5